(12) United States Patent
Kelly

(10) Patent No.: US 8,576,143 B1
(45) Date of Patent: Nov. 5, 2013

(54) HEAD MOUNTED DISPLAY WITH DEFORMATION SENSORS

(75) Inventor: Daniel G. Kelly, San Jose, CA (US)

(73) Assignee: Google Inc., Mountain View, CA (US)

( * ) Notice: Subject to any disclaimer, the term of this patent is extended or adjusted under 35 U.S.C. 154(b) by 437 days.

(21) Appl. No.: 12/973,280

(22) Filed: Dec. 20, 2010

(51) Int. Cl.
*G09G 5/00* (2006.01)
*G02B 27/14* (2006.01)

(52) U.S. Cl.
USPC .............................................. 345/8; 359/630

(58) Field of Classification Search
USPC ............... 345/7–9; 359/13, 630; 351/41, 111, 351/124, 158; 348/53; 349/11, 13, 15
See application file for complete search history.

(56) References Cited

U.S. PATENT DOCUMENTS

| | | |
|---|---|---|
| 5,093,567 A | 3/1992 | Staveley |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,926,318 A | 7/1999 | Hebert |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,272,371 B1 * | 8/2001 | Shlomo ......................... 600/424 |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer |
| 6,738,535 B2 | 5/2004 | Kanevsky et al. |

(Continued)

FOREIGN PATENT DOCUMENTS

| | | |
|---|---|---|
| GB | 2272980 A | 6/1994 |
| WO | WO96/05533 A1 | 2/1996 |

OTHER PUBLICATIONS

Cakmakci, Ozan et al., "Head-Worn Displays: A Review", Journal of Display Technology, Sep. 2006, 20 pages, vol. 2, Issue 3.

(Continued)

*Primary Examiner* — Hong Zhou
(74) *Attorney, Agent, or Firm* — Blakely Sokoloff Taylor & Zafman LLP

(57) ABSTRACT

A binocular head mounted display includes a frame for wearing on a head of a user and right and left displays mounted to the frame for displaying right and left images to the user. The binocular head mounted display further includes at least one deformation sensor system disposed in or on the frame to measure rotational deformation of the frame about at least one rotational axis that causes the right and left displays to change alignment relative to each other.

25 Claims, 4 Drawing Sheets

(56) References Cited

U.S. PATENT DOCUMENTS

| | | | |
|---|---|---|---|
| 6,747,611 B1 | 6/2004 | Budd et al. | |
| 6,829,095 B2 | 12/2004 | Amitai | |
| 6,879,443 B2 | 4/2005 | Spitzer et al. | |
| 7,158,096 B1 | 1/2007 | Spitzer | |
| 7,242,527 B2 | 7/2007 | Spitzer et al. | |
| 7,391,573 B2 | 6/2008 | Amitai | |
| 7,457,040 B2 | 11/2008 | Amitai | |
| 7,542,012 B2* | 6/2009 | Kato et al. | 345/8 |
| 7,548,012 B2* | 6/2009 | Cavalloni et al. | 310/338 |
| 7,576,916 B2 | 8/2009 | Amitai | |
| 7,577,326 B2 | 8/2009 | Amitai | |
| 7,643,214 B2 | 1/2010 | Amitai | |
| 7,663,805 B2 | 2/2010 | Zaloum et al. | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitai | |
| 7,843,403 B2 | 11/2010 | Spitzer | |
| 7,900,068 B2 | 3/2011 | Weststrate et al. | |
| 7,959,287 B1* | 6/2011 | Saffra | 351/204 |
| 8,004,765 B2 | 8/2011 | Amitai | |
| 2001/0021058 A1 | 9/2001 | McClelland et al. | |
| 2001/0022682 A1 | 9/2001 | McClelland et al. | |
| 2003/0090439 A1 | 5/2003 | Spitzer et al. | |
| 2004/0104864 A1* | 6/2004 | Nakada | 345/8 |
| 2005/0140646 A1* | 6/2005 | Nozawa | 345/156 |
| 2005/0174651 A1 | 8/2005 | Spitzer et al. | |
| 2006/0192306 A1 | 8/2006 | Giller et al. | |
| 2006/0192307 A1 | 8/2006 | Giller et al. | |
| 2007/0085845 A1* | 4/2007 | Kikuchi et al. | 345/204 |
| 2008/0219025 A1 | 9/2008 | Spitzer et al. | |
| 2009/0122414 A1 | 5/2009 | Amitai | |
| 2009/0234614 A1* | 9/2009 | Kahn et al. | 702/141 |
| 2010/0046070 A1 | 2/2010 | Mukawa | |
| 2010/0073626 A1* | 3/2010 | Engstrom | 351/63 |
| 2010/0103078 A1 | 4/2010 | Mukawa et al. | |
| 2010/0110368 A1* | 5/2010 | Chaum | 351/158 |
| 2010/0149073 A1 | 6/2010 | Chaum et al. | |
| 2010/0278480 A1 | 11/2010 | Vasylyev | |
| 2011/0071416 A1* | 3/2011 | Terada et al. | 600/544 |
| 2011/0213664 A1 | 9/2011 | Osterhout et al. | |
| 2012/0154255 A1* | 6/2012 | Hinckley et al. | 345/1.3 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

* cited by examiner

HEAD MOUNTED DISPLAY WITH DEFORMATION SENSORS

TECHNICAL FIELD

This disclosure relates generally to head mounted displays, and in particular but not exclusively, relates to binocular head mounted displays.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. Due to the infancy of this technology, there is certain to be new found practical and leisure applications as the technology evolves; however, many of these applications are currently limited due to the cost, size, field of view, and efficiency of conventional optical systems used to implemented existing HMDs, as well as, other technological hurdles that have yet to be adequately solved before HMDs will have widespread adoption in the marketplace.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method of sensing head mounted display ("HMD") deformation are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One technological hurdle to overcome to further encourage marketplace adoption of HMD technology is identifying and compensating for binocular HMD deformation. Deformation of a binocular HMD can lead to deleterious misalignment between the left and right image displays of the binocular HMD. These misalignments can result in a blurred or otherwise compromised image as perceived by the user, which ultimately leads to a poor user experience (disorientation, dizziness, etc.). Deformation can occur due to a variety of reasons including misuse, poor user fit, nonsymmetrical facial features, harsh environmental factors (e.g., thermal warping), or otherwise.

For example, if a binocular HMD is too narrow for a given user's head, the user's head will assert outward forces on each of the ear arms of the binocular HMD causing the ear arms to spread, thereby flexing the frontal display section about the nose bridge. To a lesser extent, the opposite effect, by the ears applying an inward compressing force to the ear arms, can occur if the user's head is too narrow. Additionally, if the user's ears are not symmetrical (i.e., one ear is higher than the other), a torsion force can be applied to the ear arms causing the left and right sides of the binocular HMD to twist about the nose bridge. Both of these rotational deformations can result in misalignment between the right and left displays of a binocular HMD.

Figure 1:
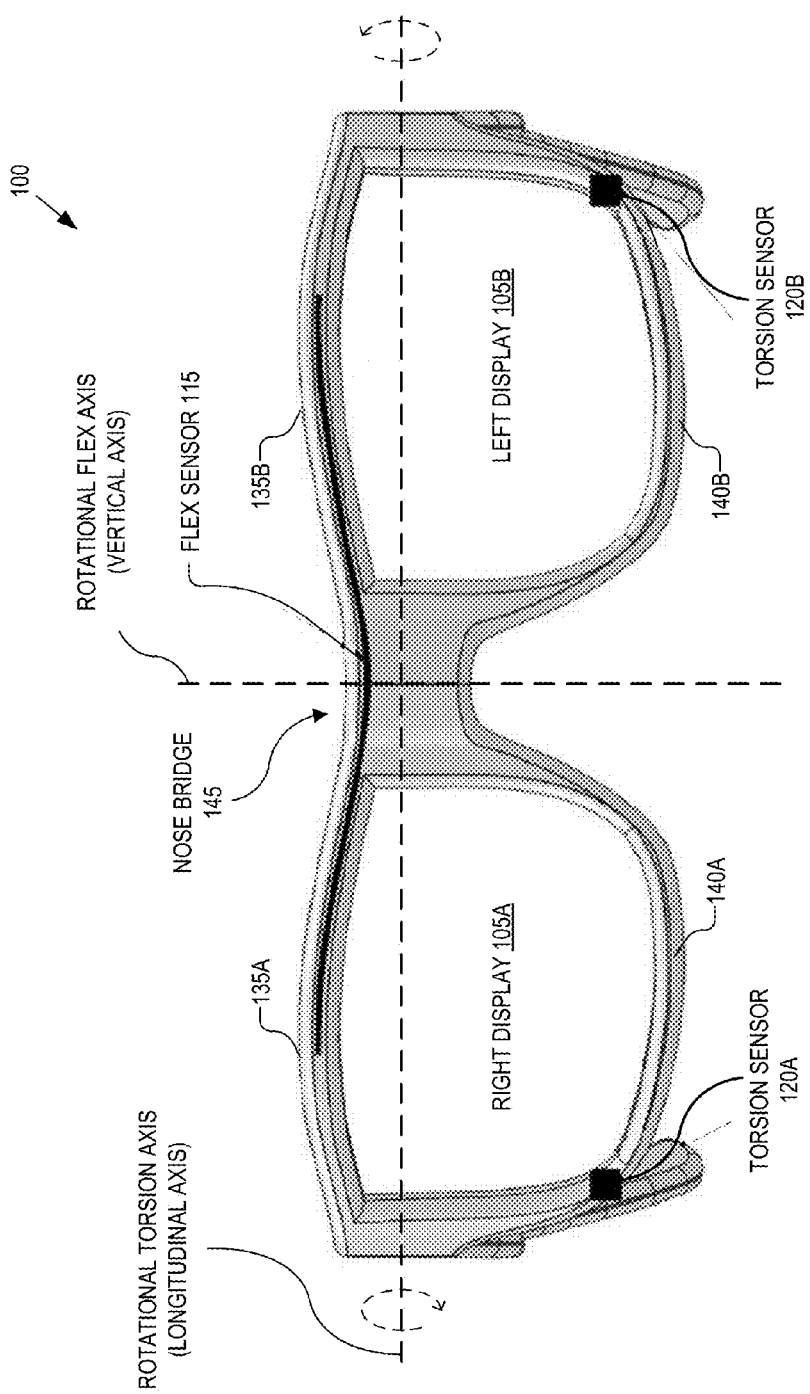
FIG. 1 is a frontal view of a binocular head mounted display ("HMD") including deformation sensors to monitor deformation of the binocular HMD, in accordance with an embodiment of the invention.
Figure 2:
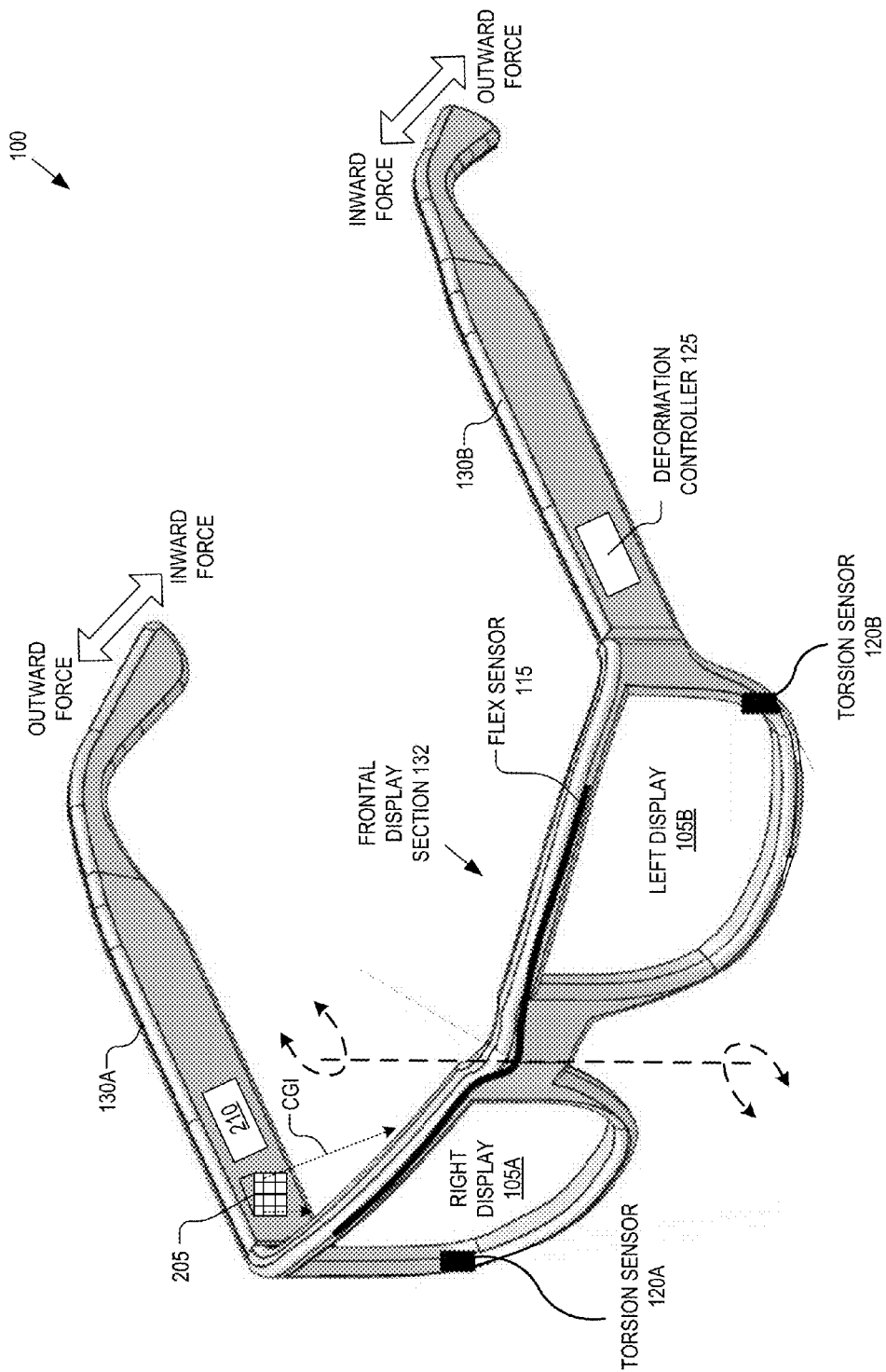
FIG. 2 is a perspective view of the binocular HMD including deformation sensors to monitor deformation of the binocular HMD, in accordance with an embodiment of the invention.
Figure 3:
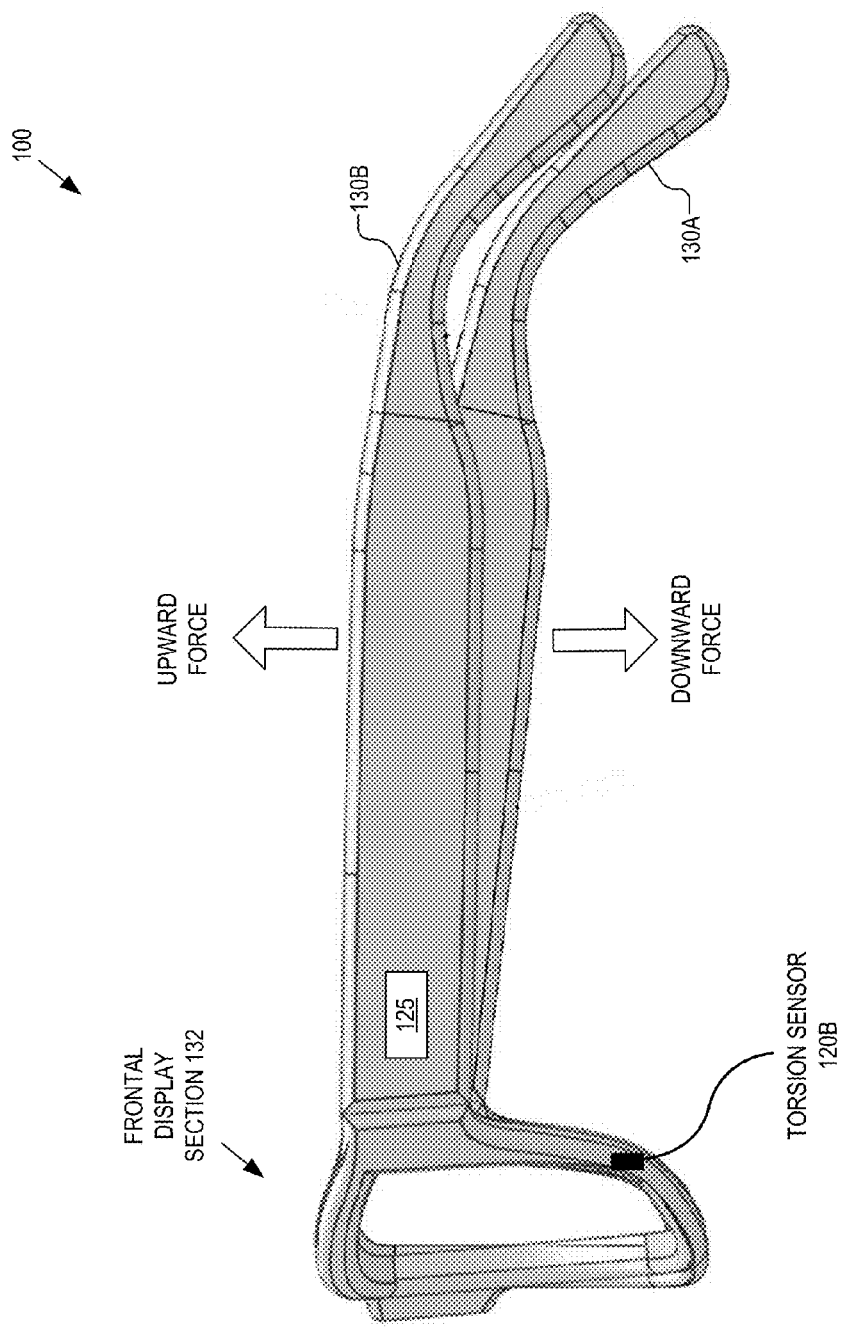
FIG. 3 is a side view of the binocular HMD illustrating torsional deformation of the binocular HMD, in accordance with an embodiment of the invention.

FIGS. 1-3 illustrate various views of an example binocular HMD 100, in accordance with an embodiment of the invention. FIG. 1 is a frontal view, FIG. 2 is perspective view, and FIG. 3 is a side view of binocular HMD 100. The illustrated embodiment of binocular HMD 100 includes right display 105A and left display 105B (collective displays 105), a flex sensor 115, a pair of torsion sensors 120A and 120B (collectively torsion sensors 120), a deformation controller 125 (FIG. 2 or 3), and a frame. The illustrated embodiment of the frame includes right ear arm 130A and left ear arm 130B (collectively ear arms 130), and a frontal display section 132. The illustrated embodiment of frontal display section 132 includes right upper display support 135A and left upper display support 135B (collectively upper display supports 135), right lower display support 140A and left lower display support and 140B (collectively lower display supports 140), and a nose bridge 145.

Displays 105 may be implemented using a variety of different binocular display technologies. For example, displays 105 may be implemented as semi-transparent optical elements or opaque optical elements. The semi-transparent optical element embodiments permit external light to pass through to the eyes of a user to provide a real-world view, but also display a super-imposed computer generated image ("CGI") over the real-world view. This type of display technology is often referred to as a heads up display ("HUD") or augmented reality. The semi-transparent optical element embodiments can further be defined into emissive embodiments (e.g., sheet of transparent organic light emitting diodes ("OLEDs")) or reflective embodiments. FIG. 2 illustrates a reflective embodiment where image sources 205 project the CGIs onto each of the displays 105, which reflect the CGIs back towards the eyes of the user. In one embodiment, image sources 205 are implemented using liquid crystal on silicon ("LCoS") image panels. Embodiments that include opaque optical elements do not permit external light to pass through displays 105, but rather only transmit the CGIs to the user eyes. These types of HMDs are often referred to as virtual reality HMDs. In both semi-transparent and opaque optical element embodiments, display controllers 210 may be used to drive displays 105 and render the CGIs. Of course, other display technologies may be used.

As discussed above, binocular HMD 100 may deform during use or overtime due to a number of environmental factors or use scenarios. As illustrated in FIGS. 1 and 2, binocular HMD 100 may be deformed about a rotational flex axis (or vertical axis) that passes through nose bridge 145. Nose bridge 145 is typically a structural weak point in the central portion of frontal display section 132 between right and left displays 105. By applying an inward force on ear arms 130, frontal display section 132 will flex at nose bridge 145 and pivot or rotate back about the rotational flex axis. Correspondingly, outward forces applied to ear arms 130 will cause frontal display section 132 to flex about nose bridge 145 and pivot or rotate forward about the rotational flex axis. These forces may occur if binocular HMD 100 is not properly fitted for the user (e.g., users head is too small or too large).

Flex sensor 115 is disposed in or on the frame to monitor and measure the degree of deformation about the rotational flex axis. In one embodiment, flex sensor 115 is disposed along the top ridge of frontal display section 132 and straddles nose bridge 145. In one embodiment, flex sensor 115 operates by measuring tensile or compressive forces/stresses as the frame is deformed. In one embodiment, flex sensor 115 is coupled to deformation controller 125, which monitors an output signal from flex sensor 115, which is indicative of the magnitude of the deformation. For example, flex sensor 115 may be implemented with a plurality of piezoelectric crystals coupled in series along a strip. In this embodiment, deformation controller 125 may bias the flex sensor 115 with a constant current and continuously measure the voltage drop across flex sensor 115. As the frame is deformed or flexed about the rotational flex axis, tensile or compressive forces will assert themselves on flex sensor 115 causing a resultant voltage change. The magnitude and sign of this voltage change is indicative of the magnitude and direction of the flexing.

It should be appreciated that flex sensor 115 may be positioned at other locations in or on the frame. For example, a flex sensor may straddle the bottom side of nose bridge 145 and run along a portion of lower display supports 140. Alternatively (or additionally), flex sensors may be incorporated into each ear arm 130. All of these locations (as well as other possible locations) hold potential for measuring flex about the rotational flex axis with varying degrees of sensitivity. In embodiments that use multiple flex sensors, each flex sensor may be coupled to a distinct deformation controller 125 or all be coupled to a single centralized deformation controller 125, as illustrated.

As discussed above, binocular HMD 100 may also deform about a rotational torsion axis (or longitudinal axis) that passes through nose bridge 145. Referring to FIGS. 1 and 3, by applying opposing upward and downward forces to ear arms 130, frontal display section 132 will twist at nose bridge 145 about the rotational torsion axis. These forces may occur if binocular HMD 100 is not properly fitted for a user who has uneven ears. The rotational flex deformation discussed above and the rotational torsion deformation now being discussed are generically referred to herein as rotational deformations about rotational axes.

Torsion sensors 120 are disposed in or on the frame to monitor and measure the degree of deformation about the rotational torsion axis. In illustrated embodiment, torsion sensors 120 are disposed at opposite sides of frontal display section 132. The torsion sensors 120 operate by measuring the gravity vector at the two locations. In the illustrated embodiment, torsion sensors 120 are coupled to deformation controller 125, which monitors the output signals from each torsion sensor 120, compares the gravity vectors measured by the two torsion sensors 120, and based upon the difference between the two measured gravity vectors determines the direction and magnitude of torsional deformation about the rotational torsion axis. Since nose bridge 145 is typically the weakest link in the frontal display section 132, the rotational torsion axis will typically pass longitudinally (or horizontally) through nose bridge 145. Torsional sensors 120 may each be implemented using accelerometers to measuring the gravity vector. In one embodiment, the accelerometers are three dimensional accelerometers. In one embodiment, the accelerometers are implemented using microelectromechanical systems ("MEMs") disposed in or on the frame. As the frame is deformed or twisted about the rotational torsion axis, the left and right sides of the frame will pivot in opposite directions relative to each other. As the two sides pivot in opposite directions, torsion sensors 120 will begin to measure different gravity vectors. The difference between these gravity vectors can be used to determine the magnitude and direction of the relative twisting between the right and left displays 105. Since the accelerometers are measuring the acceleration due to gravity, these sensors (which typically measure dynamic motions) can be used to measure static deformations in the HMD frame.

It should be appreciated that torsion sensors 120 may be positioned at other locations in or on the frame than illustrated. For example, torsion sensors 120 may be positioned at the upper outer corners of frontal display section 132, disposed in ear arms 130 near frontal display section 132, disposed anywhere along lower display supports 140, or otherwise. However, locations that increase the lever arm from the central pivot point of the torsional rotation may serve to increase the sensitivity of the sensors. Although the FIGS. 2 and 3 illustrate only a single deformation controller 125 coupled to both sensor systems 115 and 120, deformation controller 125 may be implemented using multiple controllers disposed in multiple locations, as opposed to a single centralized controller, as illustrated.

Rotational deformations of binocular HMD 100 may be reduced via appropriate design of the frame and selection of materials. By selecting stiffer materials and bulking up the frame strength about nose bridge 145, rotational deformations that cause right display 105A to become misaligned relative to left display 105B can be reduced. For example, binocular HMD 100 maybe fabricated of plastics molded around the sensor and control systems, hollow metal frame members in which or on which the sensor and control systems are disposed, or otherwise. However, the selection of stiffer materials and/or the bulkier frame designs may be heavy, uncomfortable, or aesthetically/functionally unpleasing. Thus, the deformation sensor and controller systems disclosed herein provide active monitoring of frame deformation that can be used to generate fault signals to shut down displays 105 to prevent user disorientation upon reaching a threshold degree of deformation, issue a user warning and instructions to straighten or otherwise recalibrate the frames, or even provide active feedback to image controller 210 for real-time image compensation to counteract the effects of the mechanical deformation.

Figure 4:
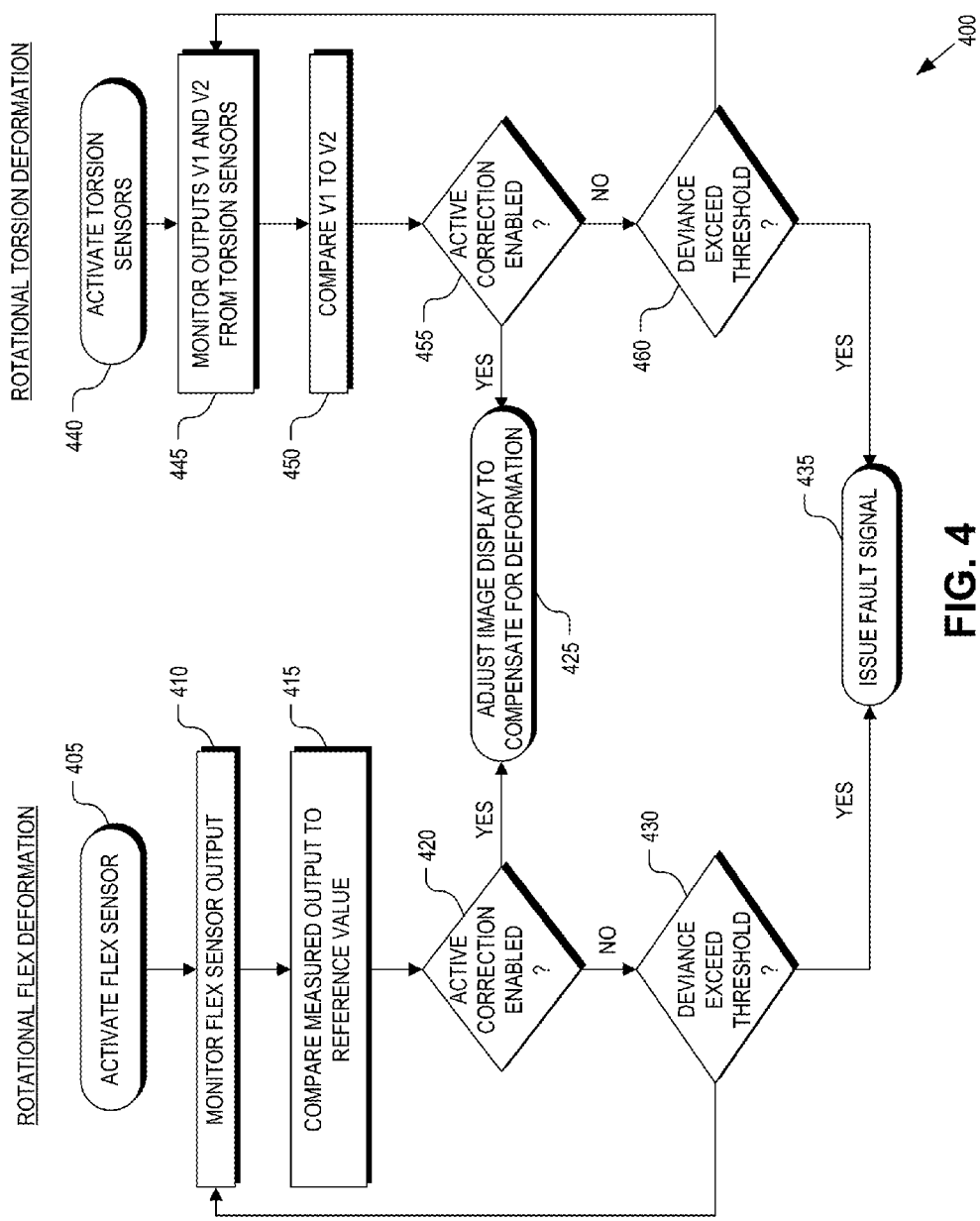
FIG. 4 is a flow chart illustrating a process for monitoring rotational deformation of the binocular HMD in real-time, in accordance with an embodiment of the invention.

FIG. 4 is a flow chart illustrating a process 400 for real-time monitoring of deformation of binocular HMD 100, in accordance with an embodiment of the invention. The order in which some or all of the process blocks appear in process 400 should not be deemed limiting. Rather, one of ordinary skill in the art having the benefit of the present disclosure will understand that some of the process blocks may be executed in a variety of orders not illustrated.

In a process block 405, flex sensor 115 is activated. In an embodiment where flex sensor 115 is implemented using piezoelectric crystals, activating flex sensor 115 may include applied a bias current across the sensor strip. In a process block 410, the output from flex sensor 115 is monitored in real-time. In one embodiment, the monitored output is the voltage across flex sensor 115. In a process block 415, the monitored output is compared to a reference value. The comparison may be executed by deformation controller 125 and the reference value may be a measured output from flex sensor 115 when the frame was known to be in alignment or non-deformed state. The magnitude and the sign of the difference between the monitored output value and the reference value may then be used to determine the direction and magnitude of the frame deformation about the rotational flex axis.

If binocular HMD 100 is configured to perform real-time active correction (decision block 420), then process 400 continues to a process block 425. In process block 425, the magnitude and/or sign of the difference value is used to apply active image correction to the CGIs displayed by displays 105. In this manner, image correction can be used to overcome mechanical frame deformations and bring the right and left CGIs back into alignment despite continued present of the physical deformations. In one embodiment, image controller 210 performs the necessary image adjustments, which may include horizontal or vertical translations, keystoning, etc.

If the frame deformation becomes too great for active image correction or if the particular embodiment of binocular HMD 100 does not support active image correction, then it may be determined whether the deformation exceeds a threshold amount. Thus, in decision block 430, it is determined whether the difference value exceeds a threshold value. If not, process 400 returns to process block 410 for continued monitoring. If so, process 400 continues to a process block 435. In process block 435, a fault signal is issued warning the user. The fault signal may disable the displays 105 or even display a warning message to the user on displays 105. In one embodiment, the warning message may include an indication of how to correct the deformation. As the user realigns the frame by applying counter forces to correct the frame deformation, the displays may display an alignment indicator to guide the user in real-time and may eventually return to regular operation once the deformation is reduced below a threshold value. Other types of warning or error signals may also be issued and/or displayed, such as an audible warning.

Simultaneous to the operation of flex sensor 115, torsion sensors 120 may also monitor the deformation of binocular HMD 100 about the rotational torsion axis. Thus, in a process block 440 torsion sensors 120 are activated. In a process block 445, deformation controller 125 receives and monitors the outputs from torsion sensors 120. In one embodiment, the outputs may be a series of voltages that are indicative of the 3-dimensional gravity vectors measured by each torsion sensor 120. In a process block 450, deformation controller 125 compares the measured gravity vectors (e.g., subtracts one gravity vector from the other). Based upon the comparison, if active correction is enabled (decision block 455), then active image correction may be applied in process block 425 to compensate for deformation about the rotational torsion axis and bring the right and left CGIs back into alignment. If active correction is not enabled and/or the deformation deviance exceeds a threshold value (decision block 460), then the fault signal may be issued, as described above, in process block 435. Otherwise, process 400 returns to process block 445 for continued real-time deformation tracking about the rotational torsion axis.

The processes explained above are described in terms of computer software and hardware. The techniques described may constitute machine-executable instructions embodied within a non-transitory machine (e.g., computer) readable storage medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, a network device, a personal digital assistant, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A binocular display, comprising:
a frame for wearing on a head of a user;
right and left displays for displaying right and left images to the user, wherein the left and right displays are mounted to the frame; and
a first deformation sensor disposed in or on the frame to measure rotational deformation of the frame about a first rotational axis that causes the right and left displays to change alignment relative to each other, wherein the first deformation sensor is coupled to monitor alignment between the right and left displays by measuring the rotational deformation of the frame.

2. The binocular display of claim 1, wherein the first deformation sensor comprises a flex sensor disposed along a frontal display section of the frame and straddling across a nose bridge between the right and left displays.

3. The binocular display of claim 2, wherein the flex sensor comprises a plurality of series connected piezoelectric crystals for measuring tensile or compressive forces along a length of the flex sensor to measure the rotational deformation of the frame about the first rotational axis passing through the nose bridge of the frame.

4. A binocular head mounted display comprising:
- a frame for wearing on a head of a user;
- right and left displays for displaying right and left images to the user, wherein the left and right displays are mounted to the frame;
- a first deformation sensor disposed in or on the frame to measure rotational deformation of the frame about a first rotational axis that causes the right and left displays to change alignment relative to each other; and
- a second deformation sensor disposed in or on the frame to measure a torsional deformation of the frame about a second rotational axis different than the first rotational axis that also causes the right and left displays to change alignment relative to each other.

5. The binocular head mounted display of claim 4, wherein the second deformation sensor comprises an accelerometer.

6. The binocular head mounted display of claim 5, wherein the second deformation sensor comprises a pair of accelerometers each disposed in or on the frame on opposing sides of the frame.

7. The binocular head mounted display of claim 6, wherein the pair of accelerometers comprises three dimensional accelerometers each for measuring a gravity vector, the binocular head mounted display further comprising:
- a deformation controller disposed in or on the frame and coupled to the pair of accelerometers, the controller including logic to compare the gravity vectors measured by the pair of accelerometers and to generate a distortion signal indicative of the torsional deformation through the nose bridge about the second rotational axis based upon a difference between the gravity vectors.

8. The binocular head mounted display of claim 6, wherein the pair of accelerometers includes a right accelerometer disposed in or on a right lower display support of the frame that support a bottom of the right display and a left accelerometer disposed in or on a left lower display support of the frame that support a bottom of the left display.

9. The binocular head mounted display of claim 4, wherein the first rotational axis comprises a vertical axis passing through a nose bridge of the frame about which the rotational deformation through the nose bridge may occur and the second rotational axis comprises a longitudinal axis passing through the frame about which the torsional deformation through the nose bridge may occur.

10. The binocular head mounted display of claim 4, further comprising:
- a deformation controller system coupled to the first deformation sensor and the second deformation sensor and including logic to generate distortion feedback signals indicative of the deformation about the first rotational axis and the torsional deformation about the second rotational axis;
- a right display controller coupled to the deformation controller system to receive at least a portion of the distortion feedback signals and to adjust the right image to compensate for one or both of the rotational deformation or the torsional deformation to bring the right image back into alignment; and
- a left display controller coupled to the deformation controller system to receive at least a portion of the distortion feedback signals and to adjust the left image to compensate for one or both of the rotational deformation or the torsional deformation to bring the left image back into alignment.

11. A method to provide tracking of deformation of a binocular head mounted display ("HMD"), the method comprising:
- monitoring a first rotational deformation of a frame of the binocular HMD about a first rotational axis passing through a central region of the frame between right and left displays of the binocular HMD, wherein the monitoring of the first rotational deformation is performed by a first sensor system disposed in or on the binocular HMD;
- monitoring a second rotational deformation of the frame about a second rotational axis passing through the central region, wherein the second rotational axis is different than the first rotational axis, wherein the monitoring of the second rotational deformation is performed by a second sensor system disposed in or on the binocular HMD;
- generating a first signal by the first sensor system indicative of the first rotational deformation of the frame; and
- generating a second signal by the second sensor system indicative of the second rotational deformation of the frame,
- wherein the first and second rotational deformations cause the right and left displays of the binocular HMD to change alignment relative to each other.

12. The method of claim 11, wherein the first rotational axis is substantially orthogonal to the second rotational axis.

13. The method of claim 12, wherein the first rotational deformation is caused at least by inward or outward forces that spread or compress ear arm members of the frame, wherein the second rotational deformation is caused at least by opposing upward and downward forces applied to the ear arm members.

14. The method of claim 11, wherein generating the first signal by the first sensor system indicative of the first rotational deformation of the frame comprises:
- measuring a current tensile or compressive force along a frontal display section passing through the central region of the frame;
- comparing the current tensile or compressive force to a reference value; and
- determining a magnitude value for the first rotational deformation based at least in part upon the comparing.

15. The method of claim 11, wherein generating the second signal by the second sensor system indicative of the second rotational deformation of the frame comprises:
- measuring a first gravity vector from a right side of the frame;
- measuring a second gravity vector from a left side of the frame;
- comparing the first and second gravity vectors; and
- determining a magnitude value for the second rotational deformation based at least in part upon the comparing.

16. The method of claim 11, further comprising:
- issuing a fault signal if one or both of the first or second rotational deformations are determined to exceed a threshold deformation.

17. The method of claim 16, further comprising:
- displaying an alignment indicator on one or both of the right or left displays to aid a user of the binocular HMD while re-aligning the frame.

18. The method of claim 11, further comprising:
- applying active image correction to at least one of the right or left displays based upon at least one of the first or second signals to compensate for misalignment between the right and left displays.

19. The method of claim 11, wherein the first sensor system comprise a flex sensor disposed along a frontal section of the frame and straddling the central region between the right and left displays.

20. The method of claim 11, wherein the second sensor system comprises a pair of accelerometers each disposed in or on the frame on opposing sides of the frame for measuring gravity vectors from the opposing sides of the frame.

21. A binocular head mounted display ("HMD"), comprising:
    a frame;
    right and left displays mounted to the frame;
    first and second sensor systems disposed in or on the frame; and
    a control system disposed in or on the frame and coupled to the first and second sensor systems, the control system including logic that, when executed, causes the control system to perform operations comprising:
        monitoring a first rotational deformation of the frame about a first rotational axis passing through a central region of the frame between the right and left displays based on a first output from the first sensor system; and
        monitoring a second rotational deformation of the frame about a second rotational axis passing through the central region based on second outputs from the second sensor system, wherein the second rotational axis is different than the first rotational axis.

22. The binocular HMD of claim 21, wherein monitoring the first rotational deformation of the frame about the first rotational axis passing through the central region of the frame comprises:
    measuring a current tensile or compressive force along a frontal display section passing through the central region of the frame;
    comparing the current tensile or compressive force to a reference value; and
    determining a magnitude value for the first rotational deformation based at least in part upon the comparing.

23. The binocular HMD of claim 21, wherein monitoring the second rotational deformation of the frame about the second rotational axis passing through the central region comprises:
    measuring a first gravity vector from a right side of the frame;
    measuring a second gravity vector from a left side of the frame;
    comparing the first and second gravity vectors; and
    determining a magnitude value for the second rotational deformation based at least in part upon the comparing.

24. The binocular HMD of claim 21, wherein the logic includes further logic that, when executed, causes the control system to perform further operations comprising:
    issuing a fault signal if one or both of the first or second rotational deformations are determined to exceed a threshold deformation.

25. The binocular HMD of claim 21, wherein the logic includes further logic that, when executed, causes the control system to perform further operations comprising:
    applying active image correction to at least one of the right or left displays based upon at least one of the first or second outputs to compensate for misalignment between the right and left displays.

* * * * *